United States Patent [19]

Inoue et al.

[11] Patent Number: 4,768,602
[45] Date of Patent: Sep. 6, 1988

[54] VEHICLE STEERING SYSTEM

[75] Inventors: Hitoshi Inoue; Gozo Watanabe; Takeshi Tanaka; Yoshihiro Watanabe, all of Hiroshima, Japan

[73] Assignee: Mazda Motor Corporation, Hiroshima, Japan

[21] Appl. No.: 880,918

[22] Filed: Jul. 1, 1986

[30] Foreign Application Priority Data

Jul. 8, 1985 [JP] Japan ................................ 60-150669

[51] Int. Cl.$^4$ ............................................. B60K 17/34
[52] U.S. Cl. ...................................... 180/140; 74/866; 180/233; 280/91; 364/424.1
[58] Field of Search ................ 180/143, 142, 141, 140, 180/234, 233; 280/91; 364/424, 424.1; 74/866

[56] References Cited

U.S. PATENT DOCUMENTS

| 4,313,514 | 2/1982 | Furukawa et al. | 180/143 |
| 4,562,541 | 12/1985 | Sakakiyama | 180/233 x |
| 4,572,316 | 2/1986 | Kanazawa et al. | 180/143 |
| 4,605,084 | 8/1986 | Haynes et al. | 180/233 X |
| 4,650,028 | 3/1987 | Eastman et al. | 180/233 |

FOREIGN PATENT DOCUMENTS 2559117  8/1985  France ................................ 280/91

Primary Examiner—John J. Love
Assistant Examiner—Mitchell J. Hill
Attorney, Agent, or Firm—Fleit, Jacobson, Cohn & Price

[57] ABSTRACT

A steering mechanism of a vehicle including a four-wheel steering system in combination with a four-wheel drive system having a front wheel steering mechanism for steering front wheels of the vehicle, a steering wheel for effecting a steering movement of the front wheel steering mechanism to a desired angle, a rear wheel steering mechanism for steering rear wheels of the vehicle, a control circuit for effecting a steering movement of the rear wheel steering mechanism in relation to the steering movement of the front wheels, and a torque ratio control assembly for compensating the steering angle of the rear wheels in accordance with torque distribution for the rear wheels. The arrangement is such that a ratio of the steering angle of the rear wheel to the steering angle of the front wheel as considered in the same direction of steering is increased in accordance with an increase in the ratio of the torque distribution for the rear wheels.

14 Claims, 8 Drawing Sheets

VEHICLE STEERING SYSTEM

BACKGROUND OF THE INVENTION

The present invetnion relates to a vehicle steering system, and more particularly to a so-called four-wheel steering system wherein fore and aft wheels are steered simultaneously. More specifically, the present invention pertains to a four-wheel steering system in combination with a four-wheel drive system provided with a torque control mechanism for controlling torque distribution among the front and rear wheels.

DESCRIPTION OF THE PRIOR ART

It has already been proposed in four-wheeled vehicles to steer not only the front wheels but also the rear wheels for the purpose of obtaining improved steering properties. For example, U.S. Pat. No. 4,313,514 discloses a vehicle steering system including a front wheel steering mechanism for steering the front wheels and a rear wheel steering mechanism for steering the rear wheels in accordance with the steering angle of the front wheels. The rear wheel steering mechanism is related to the front wheel steering mechanism so that the rear wheel is steered in the opposite direction as the front wheel under a low speed vehicle operation and in the same direction under a high speed operation. It is alleged that with this control it is possible to suppress side slips of the vehicle in operation in a curved path.

In the field of four-wheeled motor vehicles, four-wheel drive is becoming more popular and there have been proposals for controlling driving torque distribution among the front and rear wheels. More specifically, the ratio of the front wheel driving torque to the rear wheel driving torque is controlled in accordance with the vehicle operating condition. In this type of four-wheel drive vehicle, it may be desirable to adopt the aforementioned four-wheel steering system so that an improved steering property can be obtained.

In the vehicles provided with both the four-wheel steering system and the four-wheel drive system, it should however be noted that there occurs a problem due to the fact that the torque ratio for the front and rear wheels changes in accordance with the vehicle operating condition under the control by the torque control mechanism. Such a change in the torque ratio causes changes in the respective grip forces of the front and rear wheels to the road surface whereby it becomes necessary to change the steering ratio between the front and rear wheels not only under the vehicle speed but also under vehicle operating condition in order to eliminate the side slips of the vehicle. In other words, the steering property and therefore the drivability of the vehicle are affected by the change of the torque ratio.

The U.S. Pat. No. 4,572,316 issued to H. Kanagawa et. al. and assigned to the same assignee of the present invention teaches to change the ratio of the rear wheel to the steering angle of the front wheel so that the ratio is decreased as the steering angle of the front wheel increases. However, the control as disclosed in this patent does not solve the aforementioned problem inherent to a four-wheel drive vehicle having a four-wheel steering mechanism.

SUMMARY OF THE INVENTION

It is therefore an object of the present invention to provide an improved vehicle steering mechanism wherein the rear wheels are steered in relation to the steering movement of the front wheel in such a manner that drivability of the vehicle is improved in vehicles provided with both the four-wheel steering system and four-wheel drive system.

Another object of the present invention is to provide an improved vehicle steering mechanism which includes means for controlling the steering ratio of the rear wheels to the front wheels in a manner of preventing the side slips irrespective of the change of the torque distribution ratio to maintain a stable steering property of the vehicle.

According to the present invention, the above and other objects can be accomplished by a vehicle having a steering mechanism of a vehicle including front wheel steering means for steering front wheels of the vehicle, operating means for effecting a steering movement of said front wheel means to a desired angle, rear wheel steering means for steering rear wheels of said vehicle, steering angle control means for effecting a steering movement of said rear wheel steering means in relation to the steering movement of the front wheels, said steering angle control means including rear wheel steering angle setting means for determining a desired steering angle of the rear wheels in accordance with a steered angle of the front wheels and actuating means for moving said rear wheels to said desired steering angle of the rear wheels, CHARACTERIZED BY the fact that the vehicle further comprises four-wheel drive means for transmitting drive torque to the front and the rear wheels and changing a ratio of the drive torque distribution for the front and rear wheels, torque ratio detecting means for detecting the ratio of the drive torque distribution from the four-wheel drive means and producing signals denoting the torque ratio, steering ratio changing means for receiving the signals denoting the torque ratio from the detecting means to compensate said steering angle determined by the steering angle setting means based on the signals denoting the torque ratio.

According to the features of the present invention, the ratio of steering angle of the rear wheel to the front wheels is adapted to be changed in accordance with a certain property of steering angle ratio. The property of the steering angle ratio is compensated in accordance with the change of the drive torque distribution so that the steering angle ratio is controlled in accordance with the compensated property of the steering angle ratio.

The steering ratio changing means compensates the steering angle ratio of the rear wheels in the same direction as the steered direction of the front wheels in accordance with an increase of the torque distribution for the rear wheels to thereby eliminate the side slips of the vehicle irrespective of the changes of the torque distribution so that a stable steering property can be maintained.

The above and other objects and features of the present invention will become apparent from the following description of preferred embodiments making reference to the accompanying drawings.

DESCRIPTION OF THE PREFERRED EMBODIMENTS

Figure 1:
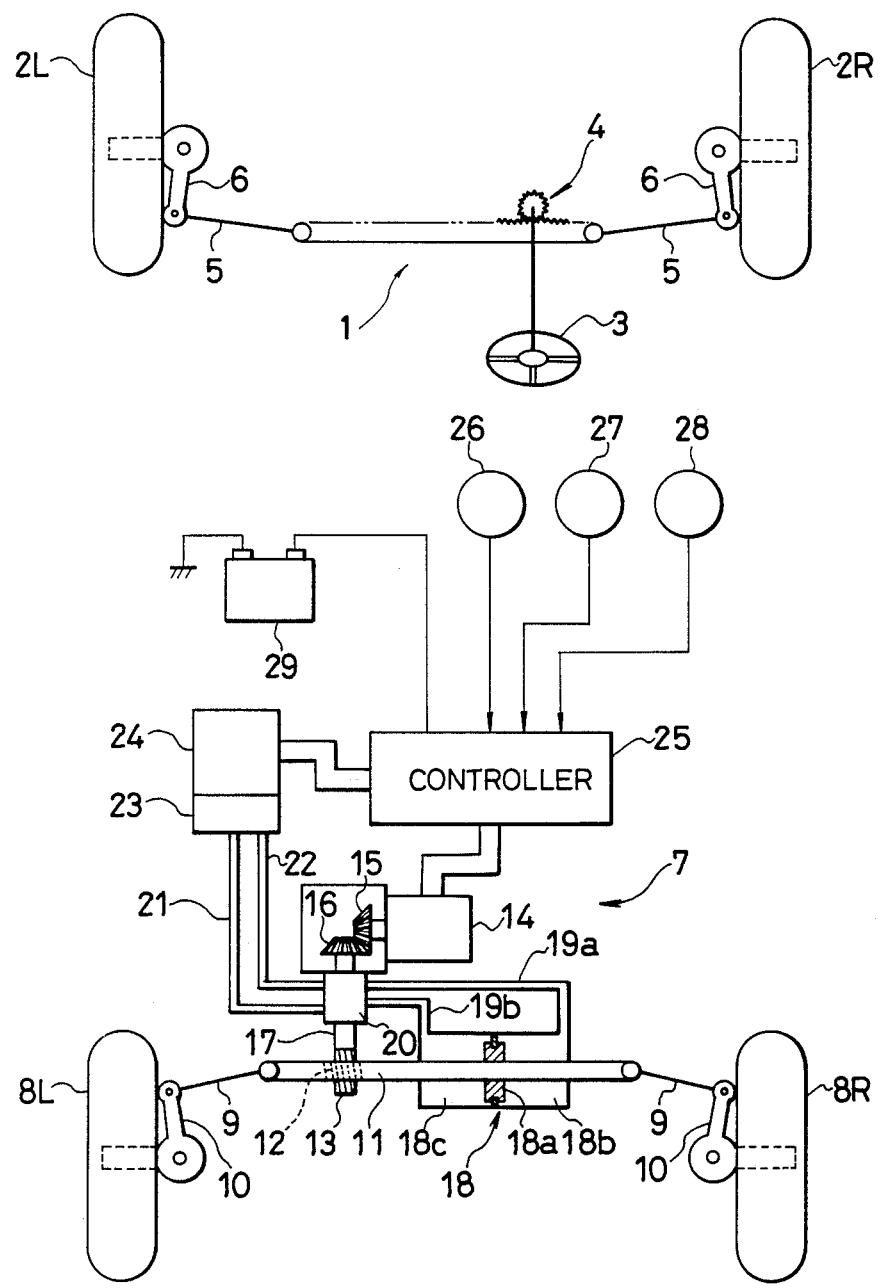
FIG. 1 is a diagrammatical illustration of a vehicle steering system in accordance with one embodiment of the present invention.

Referring to the drawings, particularly to FIG. 1, there is shown a four-wheel steering system for vehicle including a front wheel steering mechanism 1 which is adapted to steer a pair of front wheels 2R and 2L. The front wheel steering mechanism 1 includes a steering wheel 3 and a rack-and-pinion mechanism 4 which functions to convert a rotating movement of the steering wheel 3 into a linear movement. The front wheel steering mechanism 1 further includes tie-rods 5 and knuckle arms 6 for transmitting the linear movement of the rack-and-pinion mechanism 4 to the front wheels 2R and 2L.

There is further provided a rear wheel steering mechanism 7 which is adapted to steer a pair of rear wheels 8R and 8L. The rear wheel steering mechanism 7 includes a transversely extending steering rod 11 which is connected with the rear wheels 8R and 8L through tie-rods 9 and knuckle 10. The rod 11 is formed with a rack 12 which is in meshing engagement with a pinion 13 formed on a pinion shaft 17. A pulse motor 14 is provided for driving the pinion shaft 17 through bevel gears 15 and 16. It therefore will be understood that a rotation of the motor 14 causes a steering movement of the rear wheels 8R and 8L.

It will be noted in FIG. 1 that the rod 11 is connected with a power cylinder 18 through which the rod 11 is axially passed. In the cylinder 18, there is a piston 18a which is secured to the rod 11 and slidable in the cylinder 18 in the axial direction. The piston 18a divides the inside cavity of the cylinder 18 into a right chamber 18b and a left chamber 18c. When a hydraulic pressure is introduced into the right chamber 18b, the rod 11 is forced toward the left to thereby produce a leftward steering movement of the rear wheels 8R and 8L.

If however the hydraulic pressure is introduced into the left chamber 18c, the rod 11 is forced toward the right causing a rightward steering movement of the rear wheels 8R and 8L.

There is provided a hydraulic pump 23 which is adapted to be driven by an electric motor 24 to provide a supply of hydraulic pressure to the cylinder 18. The pump 23 is connected through a pressure line 21 and a return line 22 with a control valve 20 which is in turn connected through a right passage 19a and a left passage 19b with the right chamber 18b and a left chamber 18c, respectively. The control valve 20 functions to sense the direction of rotation of the pinion shaft 17 and connect the pressure line 21 to the passage 19a and connect the return line 22 to the passage 19b when the pinion shaft 17 is rotated in the direction of steering the rear wheels toward left. When the pinion shaft 17 is rotated in the direction of steering the rear wheels 8R and 8L toward the right, the control valve 20 connects the pressure line 11 to the passage 19b and the return line 22 to the passage 19a. Thus, the operation of the steering effort of the pulse motor 14 is assisted by the hydraulic power assisting mechanism.

There is further provided an electronic controller 25 which produces output signals for operating the pulse motor 14 and the hydraulic motor 23. A steering angle detector 26 is provided for detecting the steered angle of the front wheels 2R and 2L. The steering angle detector 26 may be provided on the steering wheel 3 to detect the steered angle in terms of the angle of rotation of the steering wheel 3. There are further provided a vehicle speed detector 27 for detecting the vehicle speed and a torque distribution detector 28 for detecting a torque distribution for the front and rear wheels. The signals of the detectors 26, 27 and 28 are applied to the controller 25. Further, the controller 25 is connected with a vehicle electric power source such as a battery 29.

Figure 2:
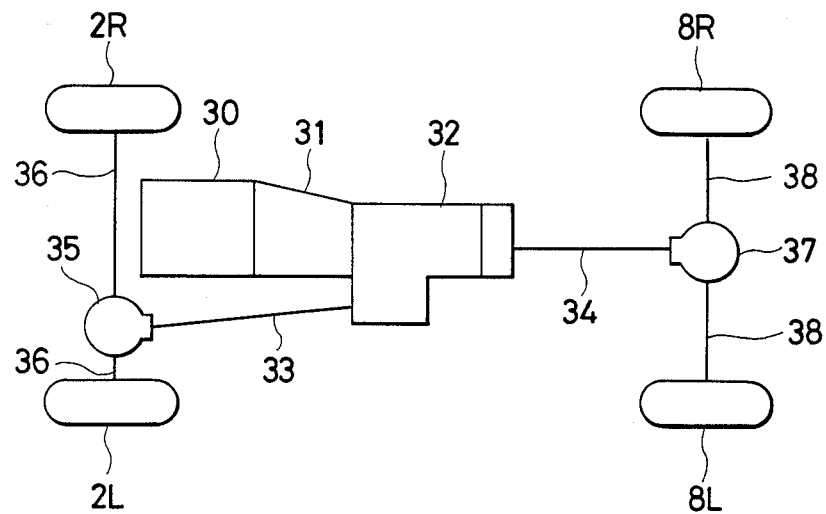
FIG. 2 is a diagrammatical illustration of a vehicle driving system in accordance with one embodiment of the present invention.

Referring now to FIG. 2, there is shown a four-wheel drive system combined with the aforementioned four-wheel steering system.

The illustrated vehicle includes an engine 30, a transmission 31 and a torque distribution control mechanism 32 connected with the transmission 31. A propeller shaft 33 for the front wheels 2R and 2L extends from the torque distribution control mechanism 32 forwardly while a propeller shaft 34 for the rear wheels 8R and 8L extends rearwardly therefrom. The front end portion of the propeller shaft 33 is connected with a differential gear assembly 35 connected to the front wheels 2R and 2L through right and left front axles 35 and 36, respectively, while the rear end portion of the propeller shaft 34 is connected with a differential gear mechanism 37 connected to the rear wheels 8R and 8L through right and left rear axles 38 and 39, respectively.

Figure 3:
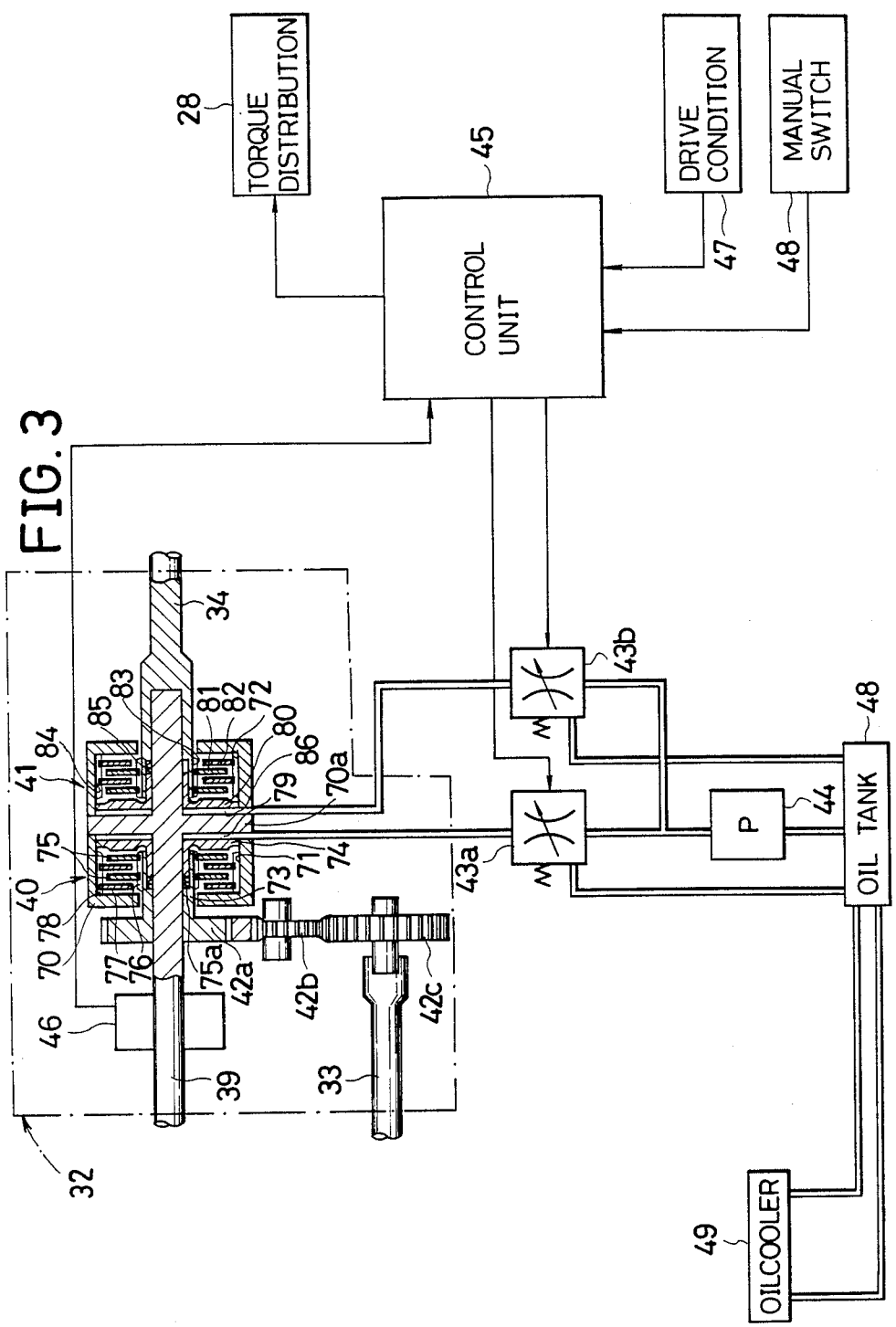
FIG. 3 is a diagrammatical illustration of a torque ratio control assembly in the vehicle driving system as shown in the FIG. 2.

As shown in FIG. 3, the aforementioned torque distribution control mechanism 32 includes a hydraulic clutch 40 for the front wheels and a hydraulic clutch 41 mounted on an input shaft 39 close to each other. The clutches 40 and 41 are disposed in a casing 70 which is divided a wall portion 70a to define oil cylinders 71 and 72. The casing is integrally formed with an input shaft 39 extending through the cylinders 71 and 72. The clutch 40 is provided with a piston 74 slidably mounted on the shaft 39 in the cylinder 71. The output shaft 73 is also mounted on the shaft 39 and engaged with the piston 74 at the rear end portion thereof. A spring 75a is disposed between the input shaft 39 and the piston 74 to urge the piston against the wall portion 70a in the axial direction of the shaft 39. The clutch 40 further includes a plurality of clutch plates 75 in meshing engagement with splines 76 formed on the rear end portion of the input shaft 39 and a plurality of clutch plates 77 meshing with splines 78 formed on the inner surface of the cylinder 71. The clutch plates 75 and 77 are alternatively and slidably disposed in the cylinder 71 so that the clutch plates 75 and 77 move along the splines 76 and 78. The clutch plates 75 and 77 are brought into contact with each other to thereby transmit the drive torque to the output shaft 73 from the input shaft 39 when the hydraulic pressure is introduced into a chamber 79 defined between the piston 74 and the wall portion 70a. The clutch 41 for rear wheels 8R and 8L as well as the clutch 40 is provided with a piston 80 mounted on the shaft 73, a plurality of clutch plates 81 and 82 in meshing engagement with splines 83 on the front end portion of the output shaft for the rear wheels 8R and 8L and splines 84 on the inner surface of the casing 70 respectively, and a spring 85. The cluch plates 81 and 82 move along the splines 83 and 84 to be brought into contact with each other when the hydraulic pressure is introduced into a chamber 86 defined between the wall portion 70a so that the drive torque from the input shaft 39 is transmitted to the output shaft 34 for the rear wheels 8R and 8L. It will be understood that the amount of the drive torque transmitted by the clutches 40 and 41 relies on the hydraulic pressure introduced into the chambers 79 and 86.

The output shaft 73 of the hydraulic clutch 40 is formed with a gear 42a at the end portion thereof. The gear 42a is engaged with a gear 42c provided at the end portion of the propeller shaft 33 for the front wheels 2R and 2L through a idler gear 42b so that the clutch 40 can transmit the drive torque to the propeller shaft 33 from the input shaft 39 when the hydraulic pressure is introduced into the chamber 79. On the other hand, the hydraulic clutch 41 is connected to the front end portion of the propeller shaft 34. The clutches 40 and 41 are communicated with a hydraulic pump 44 through flow control valves 43a and 43b.

The flow control valves 43a and 43b are controlled by signals from a control unit 45 which is adapted to receive signals from a torque detector 46 for detecting the rotation of the input shaft 39 to thereby detect a drive torque, signals from a drive condition detector 47 for detecting vehicle drive conditions, such as vehicle vibration in the up and down direction and signals from a manual switch 48 for switching the torque distribution for the front and rear wheels by means of a manual operation.

Figure 4:
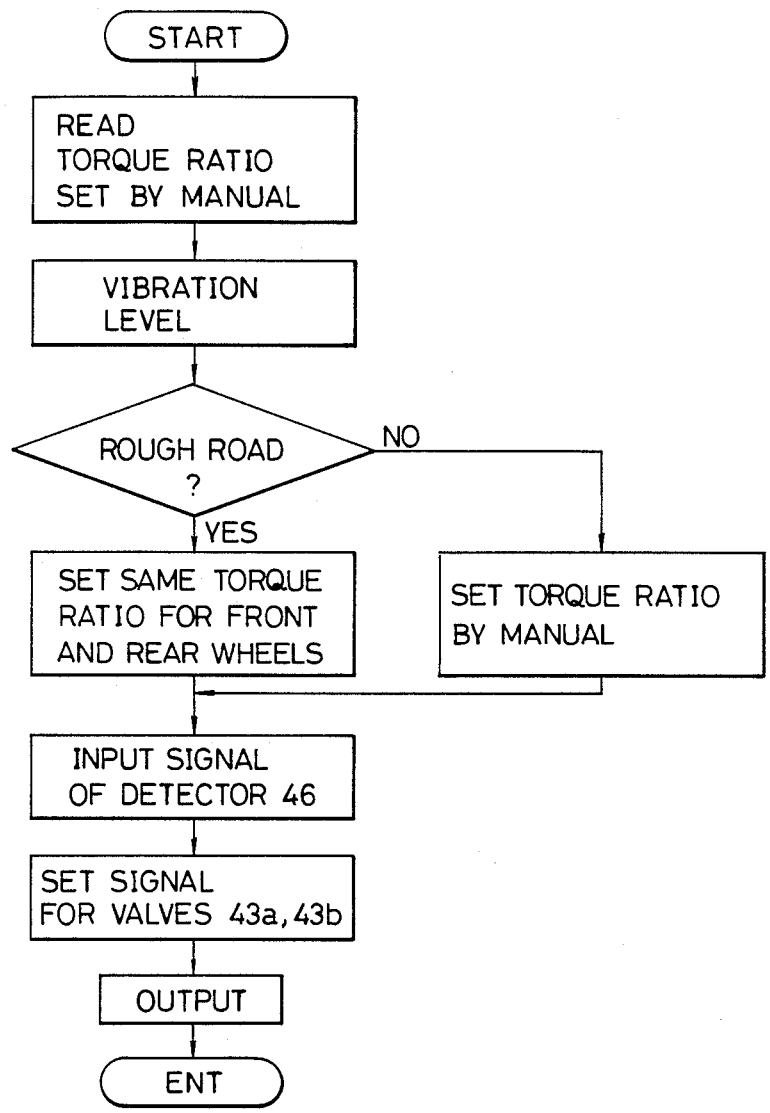
FIG. 4 is a block flow chart showing a procedure in the control unit of the torque distribution control mechanism.

The control unit 45 may be of a type including a microprocessor which produces signals to control the oil flow through the control valves 43a and 43b to thereby control the hydraulic pressure applied to the clutches 40 and 41. For example, the control unit 45 carries out a procedure as shown in FIG. 4 for the control valves 43a and 43b. In the FIG. 4, the control unit 45 reads a torque ratio value set by manual operation and a vibration level value of the vehicle. At the next step, the control unit 45 judges whether or not the vehicle is in a rough road. Then the control unit 45 determines the ratio of the torque distribution for the front wheels and the rear wheels based on the judgement to provides the same value of the front and rear wheels when the judgement is yes, that is, the vehicle is in a rough road. On the other hand, when the judgement is no, the control unit sets the torque distribution ratio for the value set by the manual operation. It is necessary to control the hydraulic pressure introduced into the clutches 40 and 41 in accordance with the amount of the engine output torque transmitted through the input shaft 39 so as to obtain a desirable transmission efficiency by the clutches 40 and 41. For this purpose, the control unit 45 reads the output of the torque detector 46 to produce signals for controlling the control valves 43a and 43b.

As described above, the flow control valves 43a and 43b control oil supplies for the hydraulic clutches 40 and 41 from the hydraulic pump 44 in accordance with the vehicle drive conditions receiving the signals from the control unit 45 to thereby change a transmission efficiency of the drive torque for the clutches 40 and 41 so that the torque distribution control mechanism 32 controls the distribution of the drive torque for the front wheels 2R and 2L, and the rear wheels 8R and 8L. The distribution of the drive torque provided by the torque distribution control mechanism 32 is detected by the torque ratio distribution detector 28 constituting torque ratio detecting means in the aforementioned four-wheel steering system in accordance with the signals from the control unit 25 so that signals detected by the torque distribution detector 28 is inputted to the control unit 45. In the FIG. 3, numeral 48 denotes an oil tank, numeral 49 denotes an oil cooler respectively.

Figure 5:
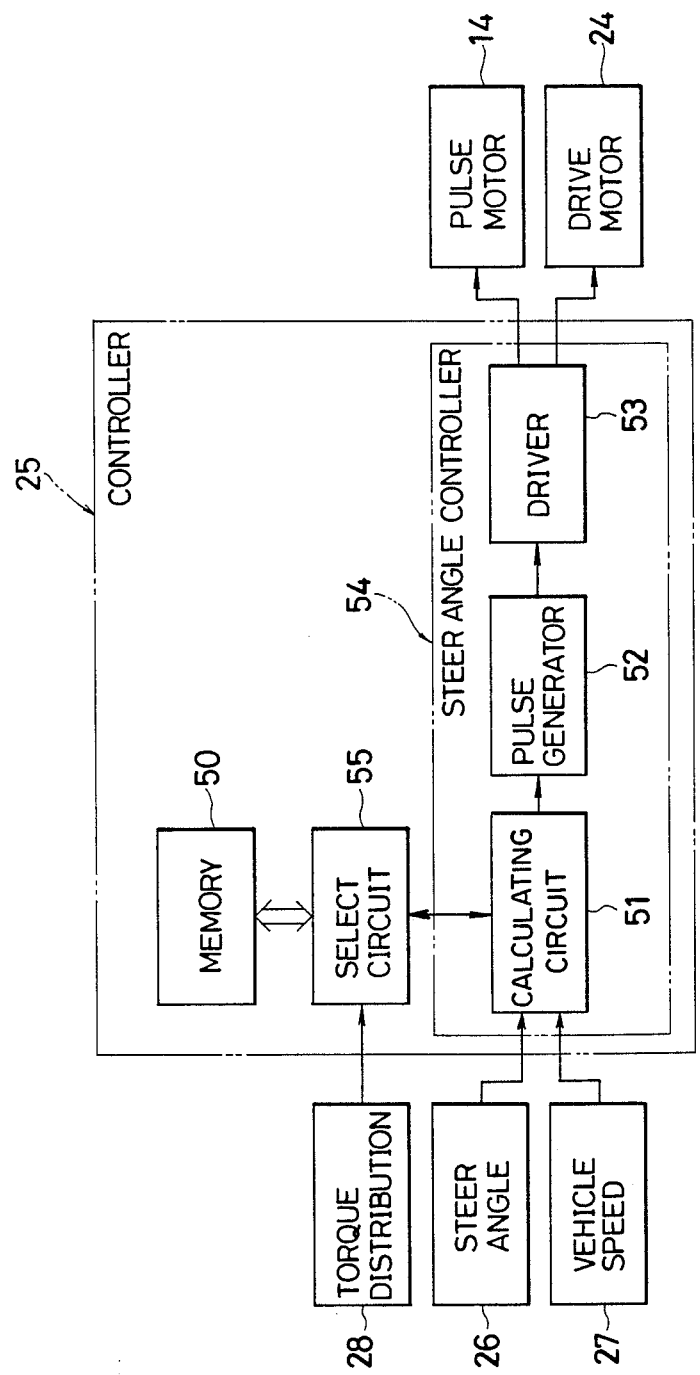
FIG. 5 is a block diagram showing one example of the control system.

As shown in FIG. 5, it will be noted that the controller 25 includes a desired steering angle calculating circuit 51, a steering angle setting means, which receives the signals from the detectors 26 and 27. The calculating circuit 51 is also connected with a memory 50 which memorizes steering angle ratios between the steering angle of the rear wheels 8R and 8L and steering angle of the front wheels 2R and 2L. The controller 25 performs a calculation based on the signals from the detectors 26 and 27 and the data from the memory 50 to determine a desired steering angle of the rear wheels 8R and 8L. The controller 25 is provided with a pulse generator 52 which is connected with the calculating circuit 51 and produces pulse signals corresponding to the desired steering angle obtained by the calculating circuit 51. The output of the pulse generator 52 is connected with a motor driving circuit 53 which produces motor driving pulse signals for driving the pulse motor 14 and the drive motor 24 which drives the hydraulic pump 23. Thus, the calculating circuit 51, pulse generator 52, and the motor driving circuit 53 form a steering angle control assembly 54 which controls the pulse motor 14 and the hydraulic pump 23 to thereby control the steering angle ratio of the rear wheels to the front wheels so that the rear wheel steering angle is conformed with the desired steering angle.

Furthermore, the controller 25 includes a steering angle changing means comprising a selecting circuit 55, as a compensator for selecting a suitable steering angle property memorized in the memory 50 receiving the signals from the torque distribution detector 28 to compensate the steering angle in accordance with the change of the torque distribution of the torque distribution control mechanism 32 so as to eliminate the side slips of the vehicle. Thus the calculating circuit 51 calculates the desired steering angle for the rear wheels based on a property selected by the selecting circuit 55 in the memory 50.

Figure 6:
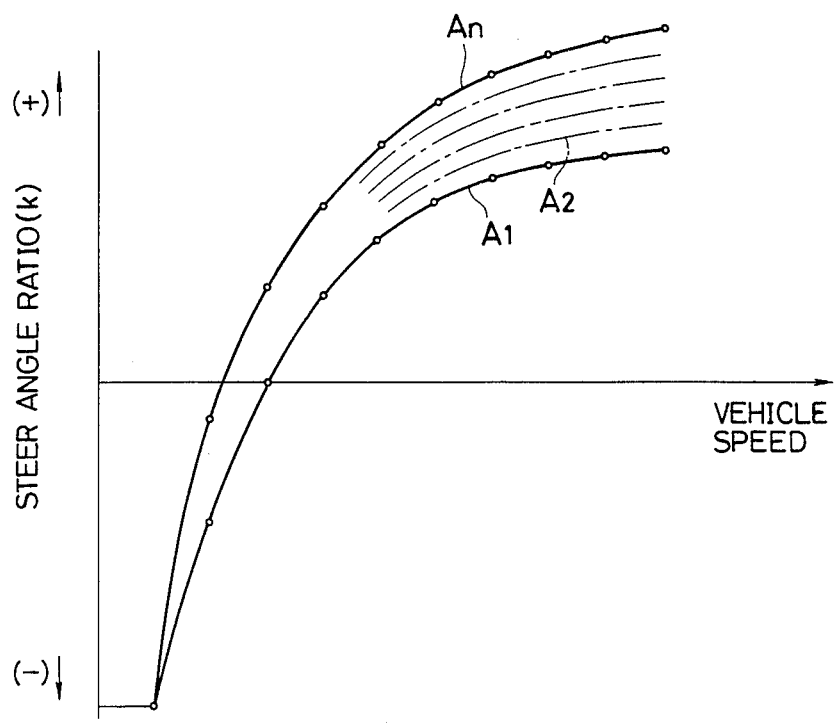
FIG. 6 is a diagram showing one example of the output of the steering angle control assembly in the control shown in FIG. 5.

The memory 50 memorizes a plurality of properties $A_1 \sim A_n$ of the steering angle ratio of the rear wheels 8R and 8L to the steered angle of the front wheels 2R and 2L corresponding with the ratios of the torque distribution as shown in FIG. 6. As shown in the Figure, in these steering angle ratio properties, the raio K changes basically to reduce in the negative value in accordance with an increase of the vehicle speed when the vehicle speed is low. This means that the rear wheels 8R and 8L are steered in the direction opposite to the direction of the steering of the front wheels 2R and 2L. When the vehicle speed is in an intermediate zone, however, the ratio K takes a positive value which means that the rear wheels are steered in the direction which is the same direction as the steering direction of the front wheels. As the vehicle speed further increases, the ratio K increases in the positive value.

The ratio property $A_1$ of the most negative side among the ratio properties $A_1 \sim An$ is selected when the torque distribution for the rear wheels is zero, that is, the vehicle is under a so-called two-wheel drive condition driven only by the front wheels. The other steering angle ratio properties $A_2 \sim An$ of the rear wheels slide in the same direction as the steered direction of the front wheels as the torque distribution for the rear wheels is increased. The ratio property An in the biggest torque distribution of the rear wheels, that is, in a two-wheel drive condition driven only by the rear wheels is considerably far away from the property $A_1$ in the same direction as the steered direction of the front wheels. It will be further understood that each of the above steering angle ratio properties $A_1 \sim An$ of the rear wheels is selected in the manner of eliminating the side slips of the vehicle.

In operation, the controller 25 reads to select the desired steering angle property of the rear wheels among the properties $A_1 \sim An$ memorized in the memory 50 through the selecting circuit 55 based on the vehicle speed signal from the detector 27, the steering angle signal from the detector 26, and the torque distribution signals from the detector 28 so that the steering ratio of the rear wheels to the front wheels is controlled by the steering angle control assembly 54 in accordance with the selected steering angle ratio property. Thus, the rear wheels 8R and 8L are steered in the opposite direction to the direction of the front wheels 2R and 2L under the low speed of the vehicle, in the same direction as the front wheels 2R and 2L steered under the high speed of the vehicle.

It will be noted that the selecting circuit 55 determines the steering angle ratio property in response to the torque distribution receiving the torque distribution signals from the torque distribution detector 28 so as to eliminate the side slips of the vehicle. Therefore, the change of the steering property can be always restrained to improve the drivability of the vehicle irrespective of the change of the torque distribution for the rear wheels.

Figure 7:
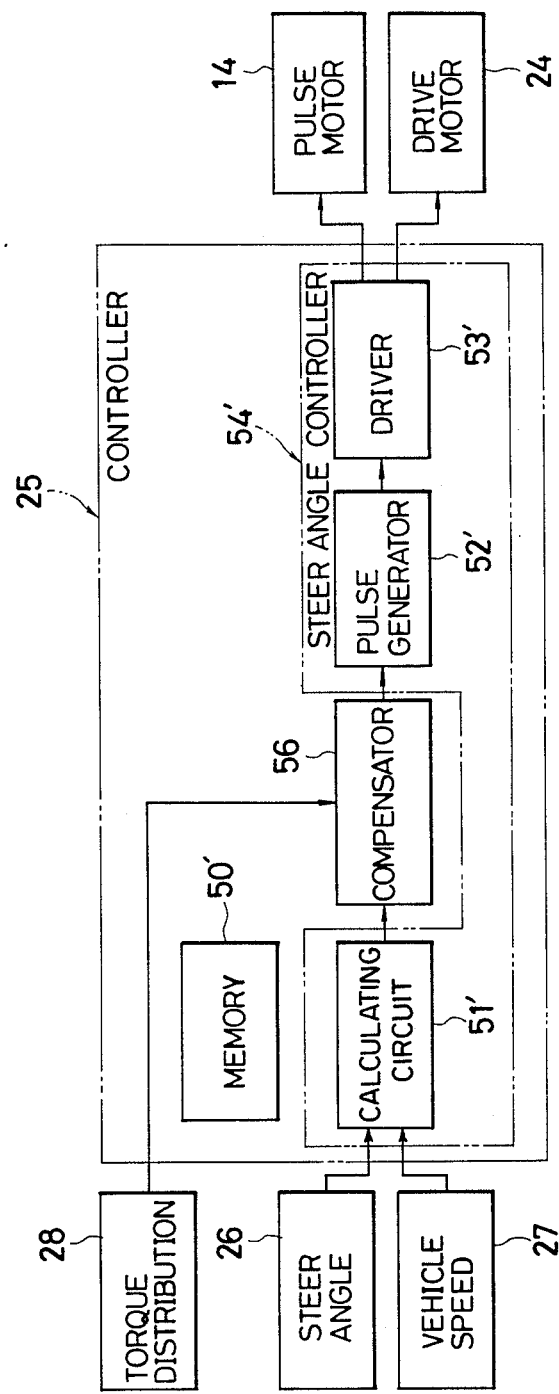
FIG. 7 is a block diagram showing another example of the control system which can be used in the steering system shown in FIG. 1.

FIG. 7 shows another embodiment of the controller 25 in the rear wheel steering mechanism 7 in accordance with the present invention. The illustrated controller 25 includes a calculating circuit 51', a pulse generator 52', and a motor driving circuit 53'. The controller 25 is further provided with a steering angle control assembly 54' which controls the rear wheel steering angle in response to the front wheel steering angle based on a desired steering angle ratio property memorized in the memory 50. In this case, the desired steering angle ratio in this embodiment is correspondent to the steering angle ratio A, for the two-wheel drive condition in the aforementioned embodiment. Furthermore, the controller 25 includes a compensating circuit 56 which is adapted to add a certain compensating steering angle to a desirable steering angle to compensate the steering angle ratio of the rear wheels in the same direction as the front wheels steered so as to eliminate the side slips of the vehicle receiving the torque distribution signals from the detector 28. It will be noted that the calculating circuit 51' provided in the steering ratio control assembly 54' calculates the desirable steering angle.

Figure 8:
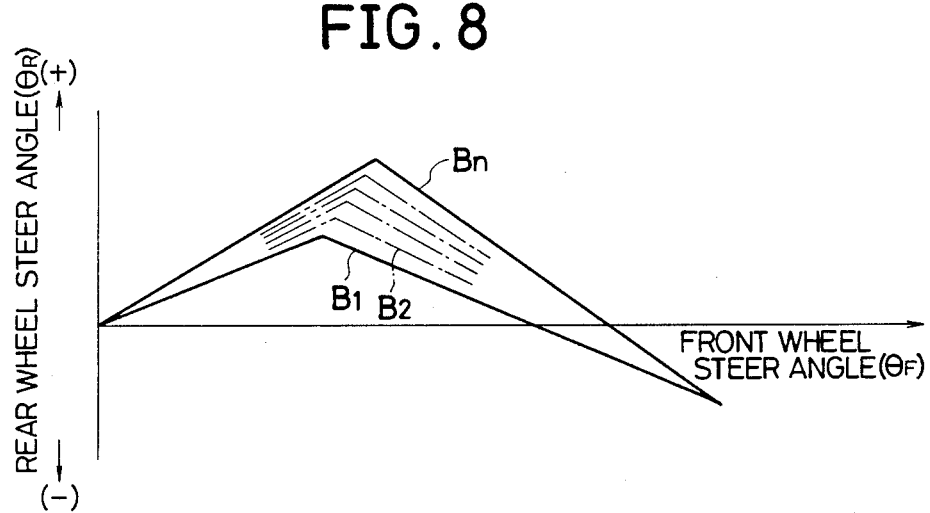
FIG. 8 is a diagram showing another example of the output of the steering angle control assembly.

Referring to FIG. 8, there is shown a diagram for steering angle ratio properties in accordance with another embodiment in the steering angle control. In the FIG. 8, the steering angle ratio properties are obtained by calculating the steering angle $\Theta_R$ of the rear wheels in accordance with the amount of the steering angle $\Theta_F$ of the front wheels. The steering angle ratio control by means of the steering angle of this embodiment is based on the fact that the steering angle $\Theta_F$ of the front wheels increases as the vehicle speed decreases. In the control, the ratio of the steering angle $\Theta_R$ of the rear wheels to the steering angle $\Theta_F$ of the front wheels is basically determined in the manner that the rear wheels are steered in the direction opposite to the steered direction of the front wheels under the low speed condition of the vehicle, but in the same direction as the steered direction of the front wheels under the high speed condition in the same manner as the steering angle ratio control based on the vehicle speed.

There are provided a plurality of the steering angle ratio properties $B_1 \sim Bn$ in response to the ratio of the torque distribution for the rear wheels. Each of the ratio properties $B_1 \sim Bn$ as well as the ratio properties $A_1 \sim An$ is set to slide gradually in the same direction as the steered direction of the front wheels in accordance with an increase of the torque distribution for the rear wheels and to eliminate the side slips of the vehicle in response to each of the torque distribution for the rear wheels. It will be noted that the ratio control based on the amount of the steering angle can be done without utilizing the vehicle speed detector 27 unlike the steering angle ratio control based on the vehicle speed of the embodiment described above referring to the FIG. 1 through FIG. 6.

Figure 9:
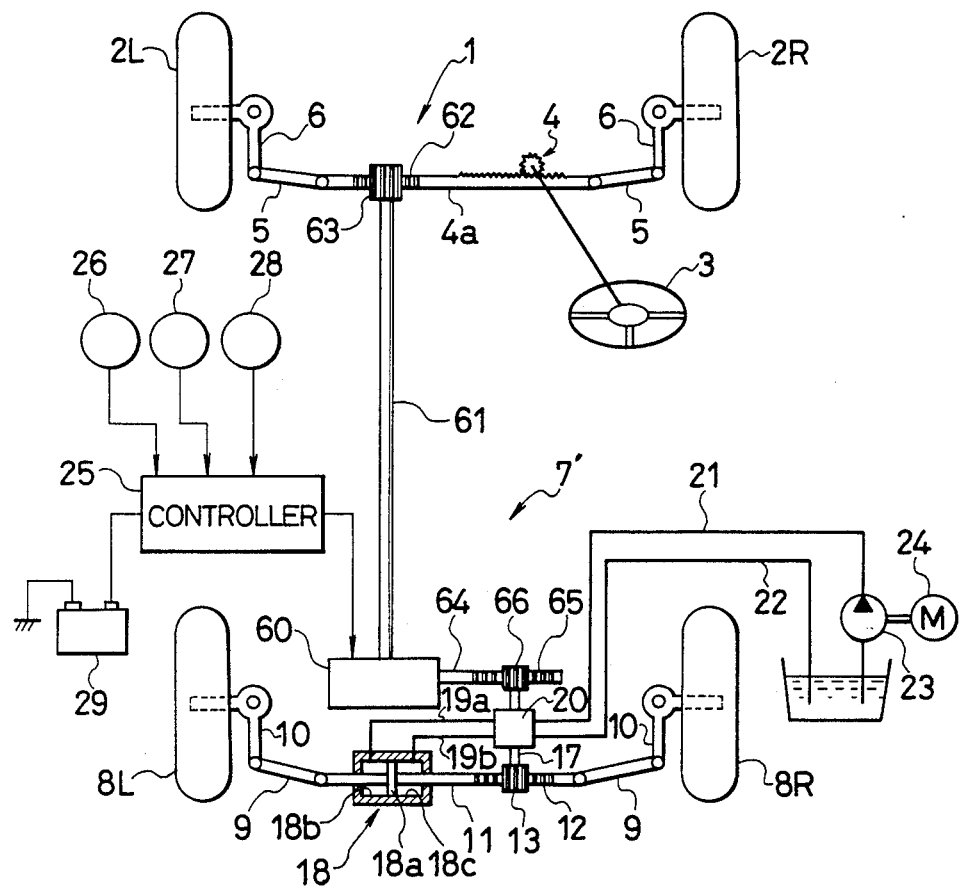
FIG. 9 is a diagram showing another example of the steering system for controlling the steering angle of the rear wheel in relation to the steering of the front wheel.

Referring now to FIG. 9, there is shown another embodiment of the four-wheel steering system in accordance with the present invention. The illustrated rear steering mechanism 7' is adapted to control the rear wheels 8R and 8L mechanically utilizing the steering force for the front steering mechanism 1 instead of the pulse motor 14 of the embodiment as illustrated in the FIG. 1.

The rear wheel steering mechanism 7' includes a motion transmitting rod 61 provided at the front end with a pinion 63 which is in meshing engagement with a rack 62 formed in the rack shaft 4a of the front wheel steering mechanism 1. The rear end of the rod 61 is connected with a steering ratio changing unit 60 which may be of a type shown in the U.S. Pat. No. 4,572,316. The unit 60 has an output member 64 formed a rack 65 engage with a pinion 66. The mechanical arrangement of the rear wheel steering mechanism 7' is substantially the same as that in the previous embodiment and includes a pinion shaft 17 on which the pinion 66 is formed. A hydraulic power assisting mechanism including a cylinder 18 and a valve 20 is also provided as in the previous embodiment. The steering ratio changing unit 60 is connected with a controller 25 of which details are shown in FIG. 5 and FIG. 7.

In the arrangement, the steering force of the front steering mechanism 1 is transmitted to the rack shaft 4a, in turn to the steering ratio changing unit 60 through the motion transmitting rod 61. The controller 25 produces an output to control the ratio changing mechanism 60 so that the steering force arranged in the mechanism 60 is transmitted to the rear wheel steering rod 11 through the output member 64 and the pinion shaft 17 to thereby steer the rear wheels 8R and 8L at a desired steering ratio to the steering angle of the front wheels 2R and 2L.

It will therefore be understood that the steering control in this embodiment is also effective to eliminate the side slips of the vehicle.

The invention has thus been shown and described with reference to specific embodiments, however, it should be noted that the invention is in no way limited to the details of the illustrated arrangements but changes and modifications can be made without departing from the scope of the appended claims.

We claim:

1. A steering mechanism of a vehicle including front wheel steering means for steering front wheels of the vehicle, operating means for effecting a steering movement of said front wheel means to a desired angle, rear wheel steering means for steering rear wheels of said vehicle, steering angle control means for effecting a steering movement of said rear wheel steering means in relation to the steering movement of the front wheels, said steering angle control means including rear wheel steering angle setting means for determining a desired steering angle of the rear wheels in accordance with a steered angle of the front wheels and actuating means for moving said rear wheels to said desired steering angle of the rear wheels, characterized by the fact that the vehicle further comprises four-wheel drive means for transmitting drive torque to the front and the rear wheels and changing a ratio of drive torque distribution for the front and rear wheels, torque ratio detecting means for detecting the ratio of the drive torque distribution from the four-wheel drive means and producing signals denoting the torque ratio, steering ratio changing means for receiving the signals denoting the torque ratio from the torque ratio detecting means to compensate said steering angle determined by the steering angle setting means based on the signals denoting the torque ratio.

2. A steering mechanism in accordance with claim 1 in which the steering ratio changing means is adapted to increase a ratio of the steering angle of the rear wheels to the front wheels as considered in the same direction of steering in accordance with an increase of the ratio of the drive torque distribution for the rear wheels to thereby eliminate the side slips of the vehicle irrespective of changes in the ratio of the torque distribution.

3. A steering mechanism in accordance with claim 1 having manual means to change the ratio of the drive torque distribution for the front and rear wheels.

4. A steering mechanism in accordance with claim 1 in which said four-wheel drive means is adapted to change the ratio of the drive torque distribution for the front and rear wheels based on the vibration of the vehicle.

5. A steering mechanism in accordance with claim 1 in which said actuating means has a pulse motor to obtain a desirable movement in the rear wheels.

6. A steering mechanism in accordance with claim 1 in which said actuating means includes means for utilizing a steering force of the front wheels to obtain the desirable movement of the rear wheels.

7. A steering mechanism in accordance with claim 1 in which said rear wheel steering angle setting means includes means for setting the desired steering ratio of said rear wheels to a negative value under a low vehicle speed operation and to a positive value under a high vehicle speed operation so that the rear wheels are steered in the opposite direction of the front wheels under the low vehicle speed operation and in the same direction of the front wheels under the high vehicle speed operation.

8. A steering mechanism in accordance with claim 1 in which said rear wheel steering angle setting means includes means for setting the desired steering angle of said rear wheels to a positive value under a small steering angle of the front wheels and to a negative value under a large steering angle of the front wheels so that the rear wheels are steered in the same direction of the front wheels under the smaller steering angle and in the opposite direction of the front wheels under the large steering angle of the front wheels.

9. A steering mechanism for a vehicle including front wheel steering means for steering front wheels of the vehicle, operating means for effecting a steering movement of said front wheel means to a desired angle, rear wheel steering means for steering rear wheels of said vehicle, steering angle control means for effecting a steering movement of said rear wheel steering means in relation to the steering movement of the front wheels, characterized by the fact that the vehicle further comprises four-wheel drive means for transmitting drive torque to the front and the rear wheels and changing a ratio of the drive torque distribution for the front and rear wheels, torque ratio detecting means for detecting the ratio of the drive torque distribution from the four-wheel drive means and producing signals denoting the torque ratio, steering ratio changing means for receiving the signals denoting the torque ratio from the torque ratio detecting means to compensate a ratio of the steering angle of the rear wheels to the front wheels based on the signals denoting the torque ratio.

10. A steering mechanism in accordance with claim 9, in which a manual switch is provided for changing a torque distribution between the front and rear wheels.

11. A steering mechanism for a vehicle including front wheel steering means for steering front wheels of the vehicle, operating means for effecting a steering movement of said front wheel means to a desired angle, rear wheel steering means for steering rear wheels of said vehicle, steering angle control means for effecting a steering movement of said rear wheel steering means in relation to the steering movement of the front wheels, said steering angle control means including steering ratio setting means for determining a desired steering ratio of the steering angle of the rear wheels to the front wheels in accordance with a vehicle speed, characterized by the fact that the vehicle further comprises four-wheel drive means for transmitting drive torque to the front and the rear wheels and changing a ratio of the drive torque distribution for the front and rear wheels, torque ratio detecting means for detecting the ratio of the drive torque distribution from the four-wheel drive means and producing signals denoting the torque ratio, steering ratio changing means for receiving the signals denoting the torque ratio from the torque ratio detecting means to compensate a ratio of the steering angle of the rear wheels to the front wheels based on the signals denoting the torque ratio, and the steering angle of the rear wheels being compensated to cause a steering movement of the rear wheels in the same direction of the steering direction of the front wheels when the drive torque distribution ratio for the rear wheels is increased.

12. A steering mechanism for a vehicle including front wheel steering means for steering front wheels of the vehicle, operating means for effecting a steering movement of said front wheel means to a desired angle, rear wheel steering means for steering rear wheels of said vehicle, steering angle control means for effecting a steering movement of said rear wheel steering means in relation to the steering movement of the front wheels, said steering angle control means including steering ratio setting means for determining a desired steering ratio of the steering angle of the rear wheels to the front wheels in accordance with a vehicle speed, characterized by the fact that the vehicle further comprises four-wheel drive means for transmitting drive torque to the front and the rear wheels and changing a ratio of the drive torque distribution for the front and rear wheels, torque ratio detecting means for detecting the ratio of the drive torque distribution from the four-wheel drive means and producing signals denoting the torque ratio, steering ratio changing means for receiving the signals denoting the torque ratio from the torque ratio detecting means to compensate said steering ratio determined by the steering ratio setting means based on the signals denoting the torque ratio.

13. A steering mechanism in accordance with claim 12, in which said rear wheel steering angle setting means includes means for setting the desired steering angle of said rear wheels to a negative value under a low vehicle speed operation and to a positive value under a high vehicle speed operation so that the rear wheels are steered in the opposite direction of the front wheels under the low vehicle speed operation and in the same direction of the front wheels under the high vehicle speed operation.

14. A steering mechanism in accordance with claim 12, in which a manual switch is provided for changing a torque distribution between the front and rear wheels.

* * * * *